Sept. 20, 1938.  W. A. READY  2,130,563
SHOVEL AND LIKE TOOL
Filed July 9, 1936
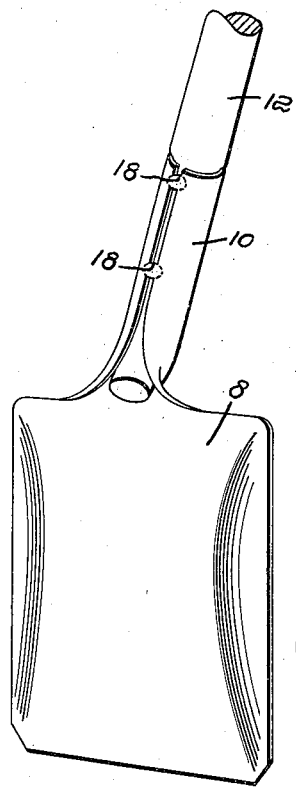
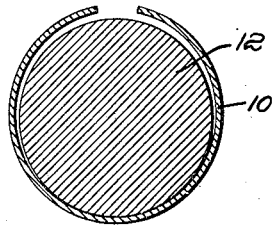
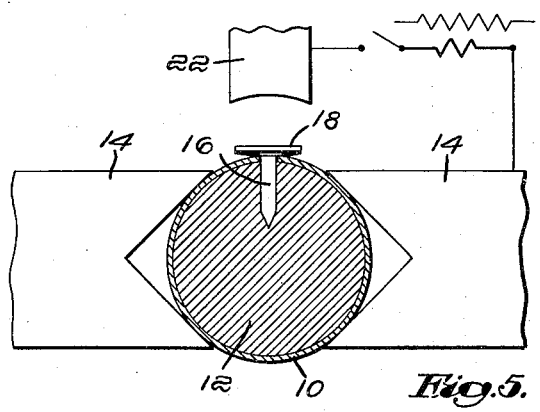
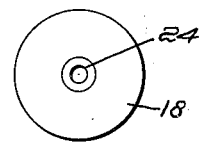
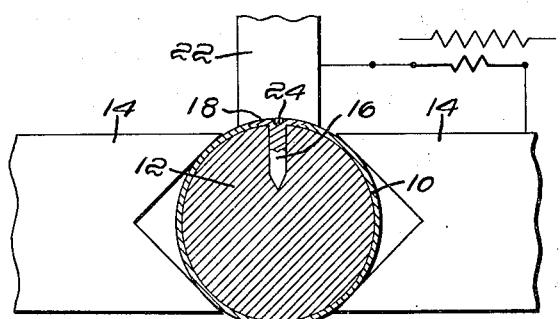
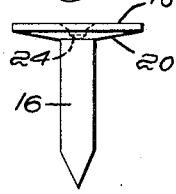
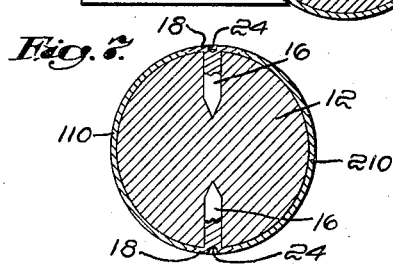
Inventor:
William A. Ready,
by Emery, Booth, Townsend, Miller & Nields
Attys Patented Sept. 20, 1938

2,130,563

UNITED STATES PATENT OFFICE 2,130,563

SHOVEL AND LIKE TOOL

William A. Ready, Brookline, Mass., assignor to Ames Baldwin Wyoming Co., Parkersburg, W. Va., a corporation of Delaware Application July 9, 1936, Serial No. 89,724

4 Claims. (Cl. 306—21)

This invention relates to shovels and other tools having a blade or like working portion and a separate handle or stale, and the object is to provide an improved construction wherein the wooden handle portion is secured to the blade in a particularly efficient manner facilitating the manufacture of the tool, improving its strength and having other advantages which will appear to those skilled in the art from the following description of an illustrative embodiment of the invention shown by way of example in the accompanying drawing, wherein:—

Fig. 1 is a perspective view from the rear side of a shovel of the hollow-back type and a portion of the handle thereof illustrating the invention;

Fig. 2 is a transverse section through the socket and handle on an enlarged scale illustrating the position of parts before the shovel is completed;

Fig. 3 is a similar view showing the parts at a later stage of the manufacture with mechanisms utilized therein shown diagrammatically;

Fig. 4 is a view similar to Fig. 3 showing a later stage;

Figs. 5 and 6 are a plan and elevation respectively on an enlarged scale of a stud utilized in the construction; and Fig. 7 is a section similar to Fig. 4 showing the embodiment of the invention in connection with a different type of shovel.

Referring to Fig. 1 of the drawing, I have there shown a shovel of the so-called hollow-back type having a blade 8 carrying at its rear end an extension 10 bent to tubular form to provide a socket for the reception of the wooden handle 12. In the case of the type of shovel shown the socket is longitudinally divided along a single line at the back.

The wooden handle 12 should fit tightly within the socket. As appears from Fig. 2, if the handle is forced into a divided socket of the type shown, it will tend to expand the same, spreading the tube along the line of division. If the handle is secured by the usual transverse rivets entered diametrically and horizontally, viewing Fig. 2, the two sides of the socket will be drawn together, but with a compensating tendency to bulge at the lower side, viewing Fig. 2, and to spread at the top. Referring to Fig. 3, I have there shown the socket 10 with the inserted handle 12 as pressed between two clamps 14 with V-shaped jaws which compress the socket in firm binding relation about the handle.

I provide suitable means for keying the handle in the socket against longitudinal withdrawal, which also in the case of the divided socket maintains it constricted on the handle. These results may be effected by utilizing studs such as those illustrated in Figs. 5 and 6 and here shown as having a rather short cylindrical and pointed shank 16 and a large head 18 which is preferably bevelled upwardly at its inner side, as illustrated at 20 in Fig. 6. These studs may be driven at suitable points into the handle between the opposed edges of the socket 10 along the line of division thereof until their heads in the zone immediately outward of the shank 16 rest against the outer faces of the opposed socket parts. An electrode 22 may then be pressed against the head of the pin with an opposed electrode in electrical contact with the socket 10 and a current of high density briefly passed in accordance with the practice sometimes known as shot welding. The metal will commence to fuse at the edges of the socket parts and at the inner portion of the head and the parts will be interfused and melt together in the position shown in Fig. 4, the marginal portions of the head merging with the portions of the socket at either side of the dividing line and the whole assuming a smooth and even outer surface under the curved end of the electrode 22. I have obtained good results with an alternating current of about 300 kilowatts applied during two cycles. This is effective to merge the lateral parts of the head of the stud with the adjacent parts of the socket without objectionable charring of the wood.

The resultant tool may appear as in Fig. 1 in which at intervals along the socket the edges of the divided tube are tied together by integral bridge pieces or straps formed by the heads of the studs, the socket being held constricted about the handle in tight gripping relation thereto. In the planes of the application of the studs the socket forms complete unbroken circles about the handle. Integrally joined with the socket are the shank portions 16 of the studs which project into the handle between its ends forming keys preventing the handle from being pulled out lengthwise.

In Fig. 7 I have shown similar studs similarly applied to a strap type of shovel in which the socket is formed by front and rear straps 110 and 210 forming a tubular structure divided along two lines disposed at the sides of the handle. Studs 16 having heads 18 may be applied at either side to hold together the opposed edges of the two straps along the lines of division of the tubular socket.

One important advantage of the construction is that when the head of the stud is welded in as described, a smooth finish is provided for without projecting parts to catch the user's hand.

Where handles are secured by rivets passing diametrically therethrough, as is now customary, the strength of the handle is substantially weakened by the transverse hole thus made, as is shown by the fact that breakages usually appear at the location of the rivet. In contrast with such a construction the strength of the handle is more fully preserved in the present instance.

For one reason or another, however, shovel handles do break. I therefore prefer to form the head 18 of the stud with a central depression 24, as best seen in Fig. 6. This depression remains in the completed shovel and if the handle breaks it provides a center point for a drill which may then be applied to drill out the stud 16 to release the old handle. The shank 16 may be completely drilled out, however, without completely destroying the head 18, the outer portion of which will remain as a bridge across the dividing line of the socket. The user may thus force a repair handle into place and apply a screw, drive screw or the like through the opening formed by the drill, thus providing a rehandled shovel comparing favorably with rehandled shovels as hitherto known.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A tool having a working portion and an extension therefrom in the form of a longitudinally divided metallic tube providing a socket to receive a handle and presenting spaced margins along the line of division facing each other in edge to edge relation, a handle in the socket, bridge pieces extending across the line of division and autogenously joined to said margins to provide unbroken encircling rings of metal about the handle and integral extensions of said pieces partly penetrating the handle and surrounded by the material thereof to lock the handle against longitudinal strains tending to withdraw it from the socket.

2. A tool having a working portion and an extension therefrom in the form of a longitudinally divided metallic tube providing a socket to receive a handle and presenting spaced margins along the line of division facing each other in edge to edge relation, studs driven into the handle along the line of division having heads autogenously joined to said margins to maintain the tube closed against expansive strains and shanks partly penetrating the handle and surrounded by the material thereof to lock the handle against longitudinal strains tending to withdraw it from the socket.

3. A tool having a working portion and an extension therefrom in the form of a longitudinally divided metallic tube providing a socket to receive a handle and presenting spaced margins along the line of division facing each other in edge to edge relation, studs driven into the handle along the line of division having heads autogenously joined to said margins to maintain the tube closed against expansive strains and shanks partly penetrating the handle and surrounded by the material thereof to lock the handle against longitudinal strains tending to withdraw it from the socket, the outer faces of the heads being recessed in line with the studs to facilitate release of the handle by drilling out the shanks.

4. A tool having a working portion and an extension therefrom providing a socket for the reception of a handle, a handle in the socket, the socket providing at least in certain transverse planes unbroken integral encircling bands about the handle, studs embedded in the handle between its ends and autogenously joined with the material of the socket, the socket presenting exteriorly depressions in alignment with the studs.

WILLIAM A. READY.